United States Patent [19]
Johnson

[11] Patent Number: 6,089,250
[45] Date of Patent: Jul. 18, 2000

[54] INFLATER GAUGE HAVING VANDAL-RESISTANT ACCESSORY ATTACHMENT MEANS

[76] Inventor: Oriz Wickline Johnson, 7086 Butterwood Dr., Cincinnati, Ohio 45241-1035

[21] Appl. No.: 09/100,061

[22] Filed: Jun. 19, 1998

[51] Int. Cl.[7] .................................................. F16K 37/00
[52] U.S. Cl. ......................... 137/227; 137/231; 285/321
[58] Field of Search ................................. 137/223, 227, 137/228, 229, 231, 798; 285/305, 321

[56] References Cited

U.S. PATENT DOCUMENTS

| | | | |
|---|---|---|---|
| 1,487,851 | 3/1924 | Hammond et al. | 137/22 |
| 1,943,469 | 1/1934 | Druge et al. | 137/227 X |
| 2,012,540 | 8/1935 | Marchus | 137/227 X |
| 2,278,776 | 4/1942 | Fowler | 137/227 X |
| 4,143,545 | 3/1979 | Sitabkhan | 137/227 X |
| 4,552,385 | 11/1985 | Peting | 285/321 X |
| 5,226,682 | 7/1993 | Marrison et al. | 285/321 X |
| 5,230,538 | 7/1993 | Kobayashi | 285/321 X |
| 5,429,396 | 7/1995 | Guest | 285/321 X |
| 5,584,512 | 12/1996 | Carstensen | 285/321 X |
| 5,707,085 | 1/1998 | Kubiak | 285/321 X |
| 5,845,945 | 12/1998 | Carstensen | 285/321 |
| 5,853,204 | 12/1998 | Bartholomew | 285/321 X |
| 5,878,774 | 3/1999 | Zanetti | 137/228 |
| 5,882,044 | 3/1999 | Sloane | 285/321 X |

*Primary Examiner*—John Rivell
*Assistant Examiner*—Meredith M. Schoenfeld

[57] ABSTRACT

An improved automobile tire inflater gauge for tankless air systems having vandal-resistant locking means for attaching gauge accessories comprising a smooth-bore female cylindrical chamber suitable for accepting accessory insertion members, said insertion members having o-rings and circumscribing lock notch groove. Said insertion member locked in chamber by a spring-ring mounted on exterior of chamber housing, said spring-ring having notches which penetrate said housing wall and enter lock groove on insertion member. The gauge additionally having a replaceable barrel cushion sleeve to reduce impact damage and an internal checkvalve to prohibit explosive tire gas migration.

9 Claims, 4 Drawing Sheets

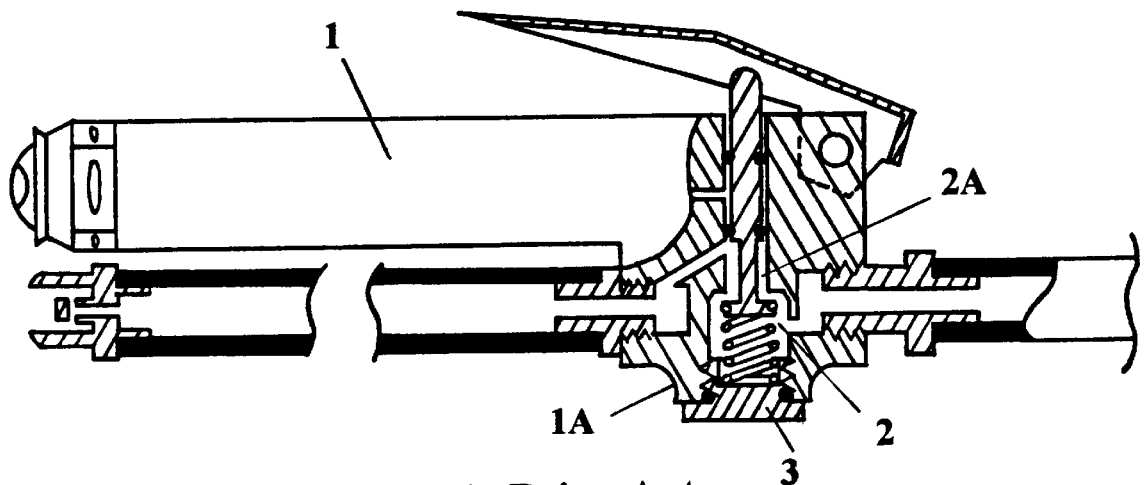
Fig 1: Prior Art
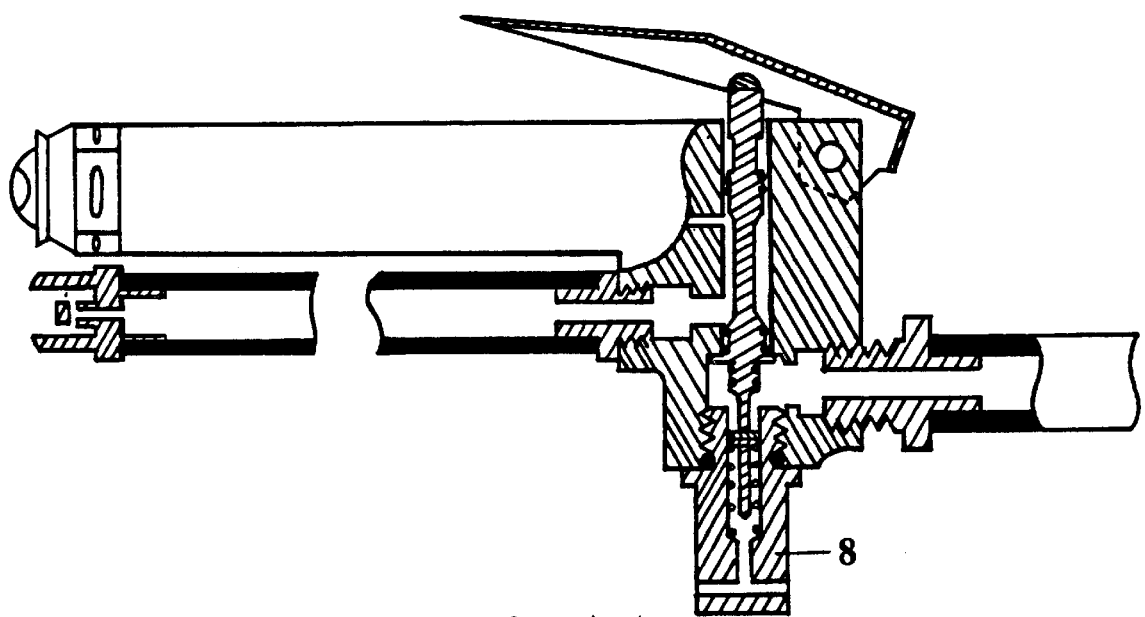
Fig 2: Prior Art

INFLATER GAUGE HAVING VANDAL-RESISTANT ACCESSORY ATTACHMENT MEANS

There are three elements of this tire inflater gauge improvement application, to wit, a vandal-resistant accessory attachment means, an explosive gas backflow checkvalve and a gauge barrel protective sleeve.

Vandal-Resistant Accessory Attachment Means

The circumstances giving rise to this application involve the inventor's related co-pending application covering a tire inflater gauge having a removably threaded automatic pressure release assembly. While the co-pending application has been approved, the official patent has not yet been issued, and the invention itself has not yet been produced.

There have, however, been test prototypes of the pressure release assembly produced and put in service, and these prototypes do reveal a weaknesses not anticipated and which is to be now addressed. The weakness, happily not related to the operation or function of the assembly, is that the unique, shiny assembly, easily screwed out and removed, is too much of a temptation to mindless vandals.

While the interlocking technique specifically designed for the above defined need may not be novel in the absolute sense, it is however, clearly a new and novel application of the technique to an automobile tire inflater gauge. Tire inflater gauges have been made by dozens of manufacturers for more than half a century, but none of the gauges have ever been equipped with such an interlocking device for the piston access cap, or any other component for that matter. Moreover, while the simple invention admirably serves the primary function of interlocking two components, it has the new, unexpected, but highly welcome results, by reason of its almost invisible ring junction and difficulty of removing same, of also materially discouraging costly vandalism.

Safety Checkvalve

The issue involved is the almost inconceivable, but apparently proven, threat of explosive gases from tires repaired with "Fix-a-Flat" pressurized cans. The residual tire gases, during the inflation process, allegedly migrate back up through the gauge, up the pressurized hose, through the compressor closed discharge valve, out of the air intake filter of the otherwise sealed compressor, where they are then apparently ignited by spurious sparks from the enclosed compressor electric power contactor, causing the steel compressor cabinet to then explode, causing possible bodily harm to bystanders. As unlikely as this scenario seems, several oil companies have been sued and are now outfitting machine cabinets with elaborate backflow prevention devices, some costing more than two hundred dollars to install.

A more cost-effective solution is a simple checkvalve optionally inserted in air inlet of the improved gauge itself.

Gauge Barrle Sleeve

All air machines are equipped with hooks on which to hang the air hose but it is ingrained in the American psyche and culture not to hang up the hose when it can, in fact, be thrown down on the hard tarmac, concrete, or more preferably into the mud. Because of the influence of the attached hose, most of these hard impacts are received by the gauge barrel which eventually becomes so bashed and battered as to become inoperative or so unsightly as to require replacement.

OBJECTIVES AND ADVANTAGES

Vandal-Resistant Accessory Attachment Means

It is seen as extremely desirable to modify the gauge to enable a more secure assembly interlock, secure and ambiguous enough to confuse or discourage casual vandalism, mostly kids, but which is simple and requires no special tools or keys. While the interlock is entitled "vandal resistant", given time, there is no such thing. The interlock will have served if it only discourages casual vandalism, which it surely will do.

Safety Checkvalve

While the phenomenal migration of explosive gas from tire through the gauge to machine-cabinet during the tire inflation taxes credulity, the phenomenon, true or not, happily has an easy solution. A simple and cheap, but highly effective, internal checkvalve makes the issue moot, and safe!

Gauge Barrel Sleeve

The solution to gauge barrel abuse is a transparent protective sleeve which, incidentally, reveals the barrel beneath it and appears to be an integral and unobtrusive part of the chromized gauge itself. The very tough, flexible skin is very forgiving of nicks and pings, bangs and bruises, but when it too becomes unsightly, it can be replaced for pennies. The very real effect of the sleeve is to prolong the life of the gauge, not only cosmetically but functionally as well.

SUMMARY

In brief summary my gauge improvement invention comprises (1) a smooth-bore female chamber in gauge bottom (2) an accessory male insertion member (3) means for removably locking the male insertion member in the gauge chamber (4) an internal safety checkvalve and (5) a gauge barrel protective sleeve.

DESCRIPTION OF THE DRAWINGS

FIG. 1: A cutaway section of a prior art conventional tire inflater gauge.

FIG. 2: A cutaway section of a prior art conventional gauge equipped with pressure release assembly in lieu of piston access cap.

LIST OF REFERENCE NUMBERS IN DRAWINGS

| | |
|---|---|
| gauge | 1 |
| chamber housing | 1A |
| piston access chamber | 2 |
| valve piston bore | 2A |
| piston access cap | 3 |
| smooth-bore chamber | 4 |
| lock-ring groove | 5 |
| slots | 6 |
| insertion member | 7 |
| release assembly | 8 |
| shoulder | 9 |
| o-rings | 10 |
| lock-notch groove | 11 |
| lock ring | 12 |
| lock-ring notches | 13 |
| opposing ends | 14 |
| air inlet recess | 15 |
| air hose | 16 |
| checkvalve body | 17 |
| taper spring | 18 |
| air inlet port | 19 |
| alignment probe | 20 |
| protective sleeve | 21 |
| gauge barrel | 22 |
| indicator assembly | 23 |
| threaded collar | 24 |
| screws | 25 |
| integral collar | 26 |
| lock pins | 27 |
| bayonet slots | 28 |
| o-ring collar | 29 |
| collar lock tabs | 30 |
| collar tab slots | 31 |

DESCRIPTION OF THE INVENTION

Vandal-Resistant Accessory Attachment Means

Gauge Body

FIG. 1: In the prior art conventional gauge 1, female piston-access chamber 2, communicates with the valve piston bore 2A such that pistons may be replaced as required. The bottom of chamber 2 is threaded to accept a conventional threaded access cover cap 3, or to accept the threaded male pressure release assembly of the inventor's co-pending application.

FIG. 2: When the pressure release assembly is applied to a conventional gauge, the assembly is screwed into the bottom threads of the gauge in lieu of the piston access cover cap 3. The treaded connection between the two makes it easy to remove the assembly which is too tempting for vandals.

Figure 3:
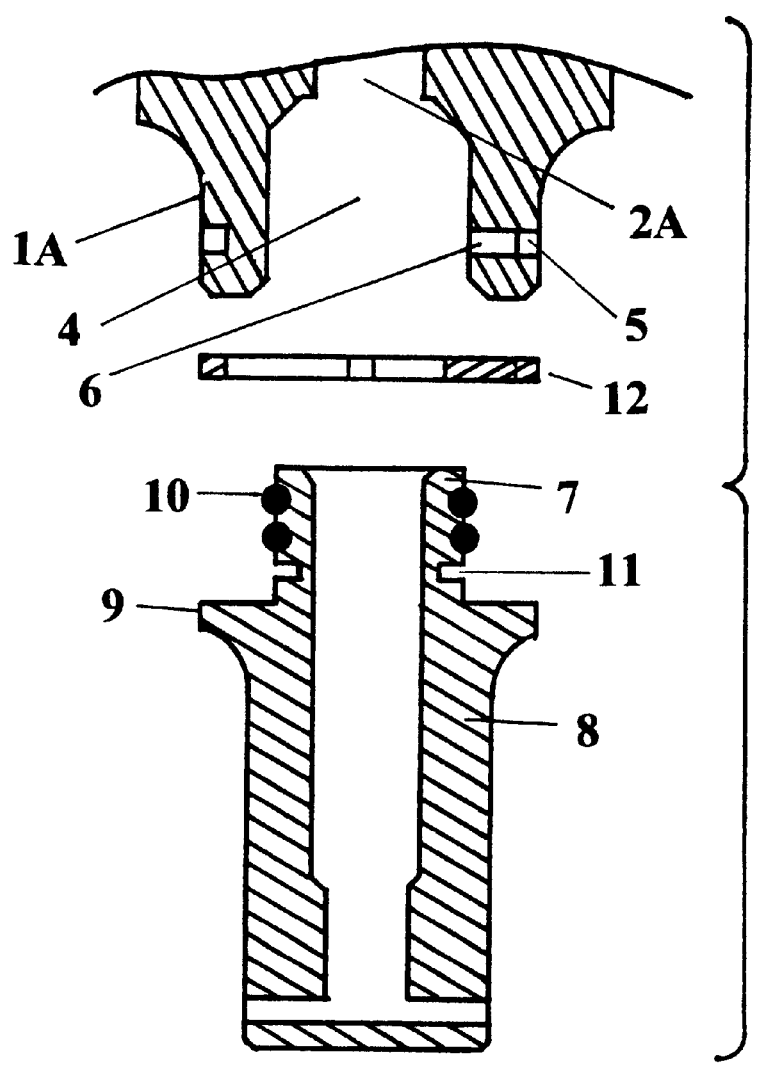
FIG. 3: A section view of gauge bottom showing smooth-bore chamber, housing lock-ring groove and release port assembly insertion member.

FIG. 3: In this vandal resistant application, the vandal-resistant accessory attachment locking means comprises the gauge body 1 provided with a smooth-bore acceptor chamber 4 of similar dimensions in lieu of the threaded chamber 2 said smooth bore acceptor chamber 4 extending from bottom of prior art piston bore 2A thru bottom of the gauge. Additionally, an annular lock-ring groove 5 circumscribes the exterior wall 1A of the gauge housing the smooth-bore acceptor chamber 4. The lock-ring groove has three equidistant slots 6 communicating through the housing wall.

Insertion Member

In lieu of a threaded male top member, this version of the pressure release assembly 8 has a top insertion member 7 between top and shoulder 9 having no threads but, instead, a plurality of exterior o-rings 10 and a lock-notch groove 11.

Lock Ring

Figure 4:
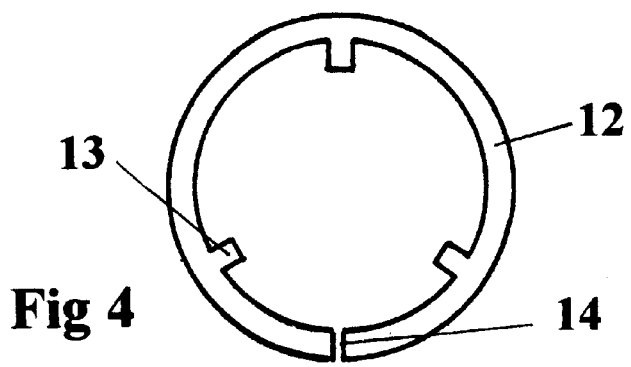
FIG. 4: A plan view of lock-ring showing lock notches.

FIG. 4: The annular lock-ring 12, made of stiff stainless spring steel, biased to grip lock-ring groove 5 tightly, has three equidistant inward notches 13, each notch sufficiently deep to penetrate the matching slots 6 through the chamber wall and into lock-notch groove 11 of insertion member 7 when inserted. Unlike the threaded assembly which can be easily removed by random vandalism, the lock ring, once inserted and having two tight and close-fitting ends 14, must be very deliberately addressed to remove.

Checkvalve

Figure 5:
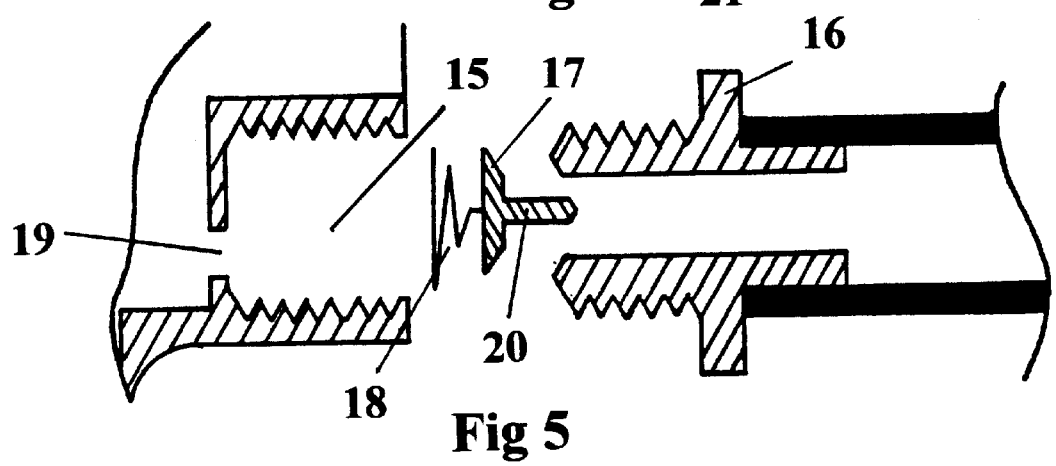
FIG. 5: A section view of gauge air hose connection showing internal check valve.

FIG. 5: The checkvalve body 17, a disk-shaped member made of plastic or similar light material, having the tip of a taper spring 18 embedded in its backside and a forward bevel edge terminating in alignment probe 20. The small diameter of the body and taper spring assembly is such that it can be inserted, spring first, into the threaded recess of the gauge air inlet 15.

Probe 20 is of sufficiently lesser diameter than the air hose fitting inside diameter 16 such that when the air inlet hose is threaded into the gauge the probe enters the end of the fitting. When the air flows, it flows around the probe and pushes the body 17 back against the bias of taper spring 18 to a point of equilibrium between the pressure of the entering air versus the bias of the spring. The tip of the probe remains in the air hose even when the body is fully backed, thus insuring the proper re-setting of the body into the air hose, sealing the hose against back flow of any explosive gases from the tire when the compressor stops.

Protective Sleeve

Figure 6:
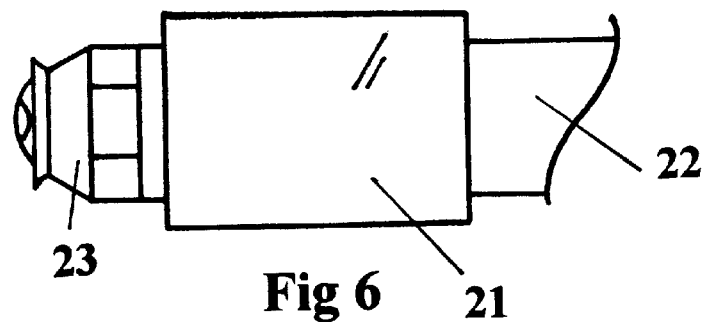
FIG. 6: A partial elevation of gauge barrel showing protective sleeve in place.

FIG. 6: This feature is a replaceable plastic protective sleeve 21, made of tough transparent, semi-flexible, vinyl plastic having 5/16 inch wall thickness and 2 inches long, oiled and slid externally over the gauge barrel 22 to absorb the shock of being dropped or thrown on concrete. The friction fit of the sleeve once in place, is so intense it must be cut off, thus negating casual vandal removal.

OTHER EMBODIMENTS OF LOCKING MEANS

The embodiment of an improved conventional air gauge having vandal-resistant accessory lock as defined above is much the preferred embodiment for many direct and indirect reasons. There are, however, several other manifestations of the interlock concept, having differing degrees of vandal resistance, which are quite functionally valid. Some of these variations are shown below. These and all others of similar ilk are believed to be encompassed by the claims of this application.

Figure 7:
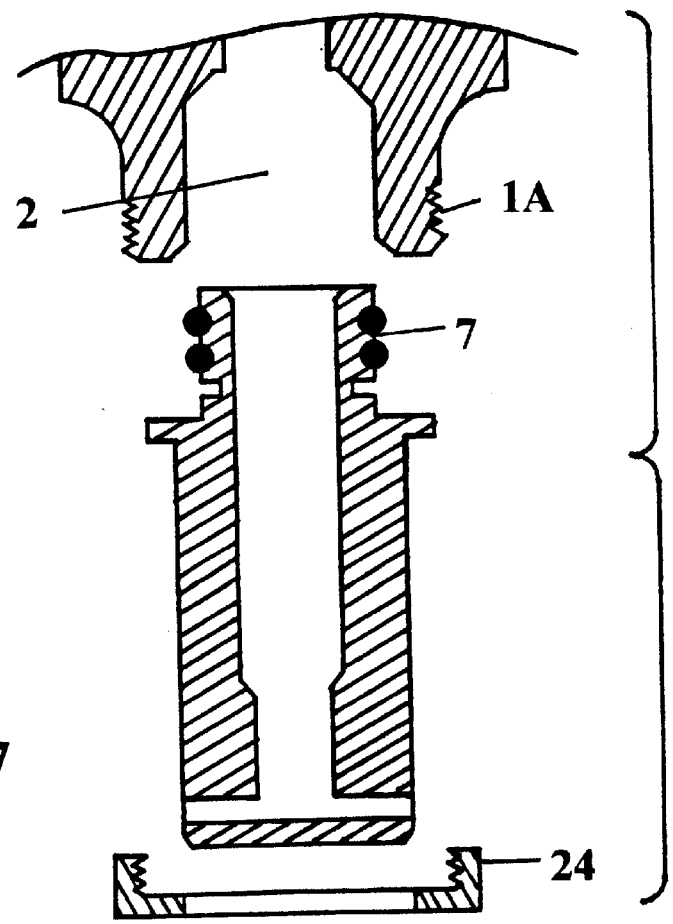
FIG. 7: Sectional view of embodiment having threaded collar.

FIG. 7: In this embodiment, the insertion member 7 is inserted in smooth-bore chamber 4 and internally threaded collar 24 is screwed onto external threads of chamber housing 1A, drawing the assembly tight.

Figures 8, 9, 10:
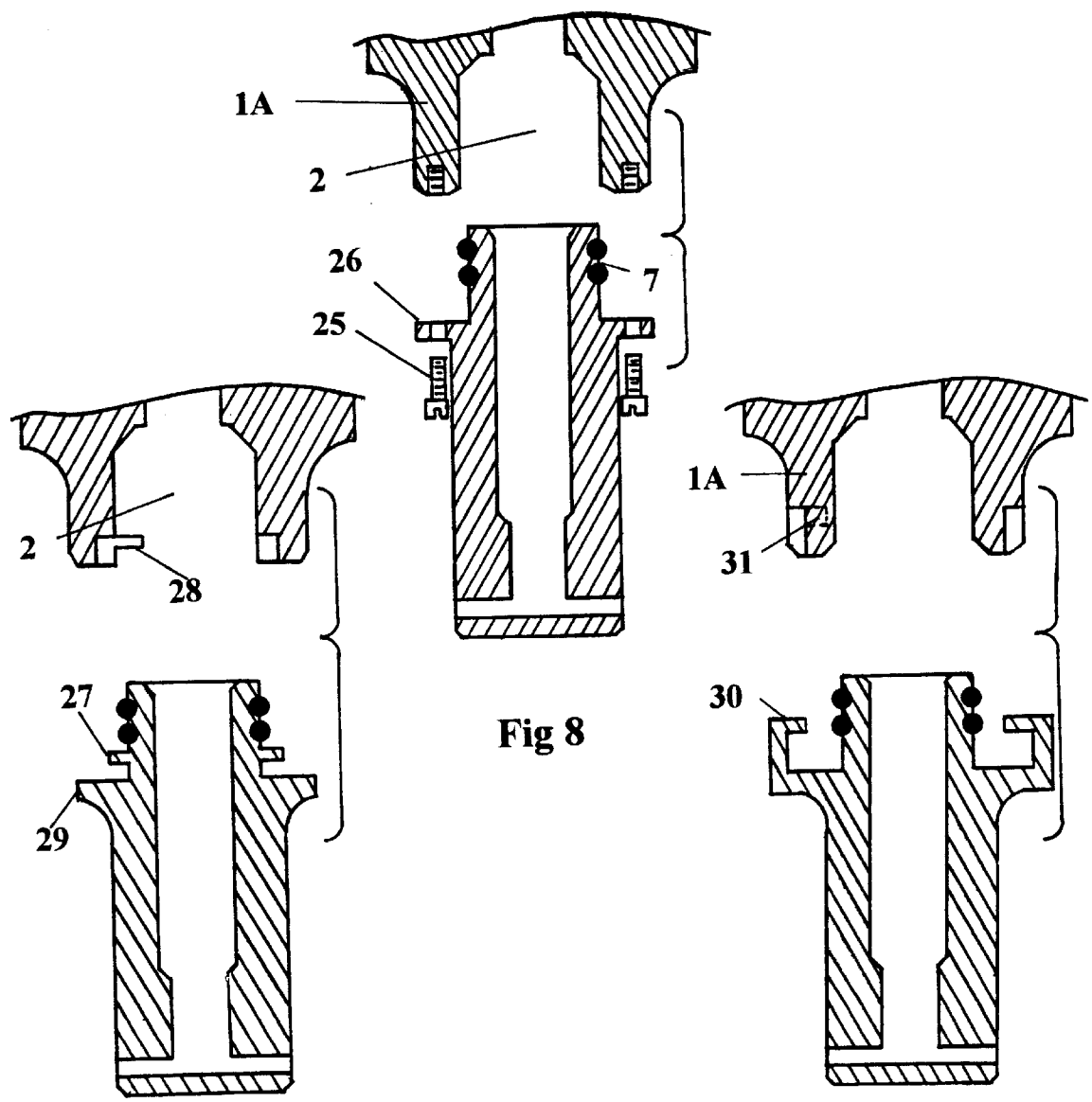
FIG. 8: Sectional view of embodiment having integral collar and mounting screws.
FIG. 9: Sectional view of embodiment having bayonet type lock and pins
FIG. 10: Sectional view of embodiment having collar with locking tabs.

FIG. 8: In this embodiment, the insertion member 7 is inserted in smooth-bore chamber 4 and screws 25 secure integral collar 26 to chamber housing 1A, drawing the assembly tight.

FIG. 9: In this embodiment, the insertion member 7 is inserted in smooth-bore chamber 4 and lock pins 27 of bayonet-type lock enter bayonet slots 28 in chamber housing 1A, drawing o-ring collar 29 and the assembly tight.

FIG. 10: In this embodiment, the insertion member 7 is inserted in smooth-bore chamber 4 and collar lock tabs 30 engage tab slots 31 in chamber housing 1A, drawing the assembly tight.

OPERATION OF THE INVENTION

Vandal-Resistant Accessory Attachment Means

FIG. 3–4: The operation of the assembly vandal-resistant locking means is quite simple. The insertion member 7 of a pressure release assembly accessory, or any appropriately configured accessory, to be locked into the gauge is inserted into the smooth-bore chamber 4 in chamber housing 1A. The lock ring 12 is manually expanded slightly, slipped over the bottom of the exterior of the gauge chamber housing 1A, and snapped into the lock-ring groove 5. The lock-ring notches 13 penetrate through slots 6 and engage the lock groove 11 of the insertion member locking the member in place. O-rings 10 on the insertion member seal against air leakage during compressor operation. The opposing ends 14 of the lock spring when in place are virtually touching each other and barely visible. It requires a knife-edge and diligence to spread the ends to remove the lock spring.

Safety Check Valve

Compressor Running

FIG. 5 As high pressure air from the compressor enters the gauge through air hose fitting 16 the air pressure presses checkvalve body 17 back against the bias of taper spring 18 allowing the air to exit to a hose end 16, flow around the checkvalve body and enter the air inlet port 19.

Compressor Not Pumping

FIG. 5 When the compressor completes its timed run and air flow stops, the bias of taper spring 18, guided by alignment probe 20, resets checkvalve body 17 back into the end of the air hose fitting 16 to check flow of explosive tire gases back through the gauge.

Gauge Barrel Sleeve

FIG. 6: Replaceable protective cylindrical sleeve 21 is removably slid onto gauge pressure-indicator barrel 22 immediately behind the air pressure indicator assembly 23, to be replaced as cosmetically required.

CONCLUSIONS, RAMIFICATIONS AND SCOPE OF INVENTION

Thus the examiner will see that the improved air gauge enables the interlocking of the gauge with a piston access accessory with confidence that casual, mindless vandalism will not defeat the junction. Moreover, the longer gauge life enabled by the protective sleeve and personal safety against explosive gases, are all clearly novel and in the public interest.

While my above description of my preferred embodiment and other embodiments contains many specificity's, these should not be construed as limitations on the scope of the invention, but rather as an exemplification of one preferred embodiment thereof. Many other variations of the concepts defined are possible. For example:

a. Lock-notch grooves and o-rings mounted on the insertion member of any accessory can be interchanged and still achieve the same results.

b. Types of openings through the chamber wall other than slots can be employed.

c. The piston access chamber and chamber exterior could be other than cylindrical.

d. O-rings could be omitted and packing glands used instead.

c. The simple but unique back-flow checkvalve could be positioned in other locations in the air passage and could also be configured as a flap valve.

d. The replaceable barrel protective sleeve could be configured as flat-sided or ball-like, etc. and mounted on the gauge differently, i.e. screwed on, and of virtually any resilient, flexible material such as rubber.

Accordingly, the scope of the invention should be determined not by the embodiments illustrated but by the appended claims and their legal equivalents.

I claim:

1. An improved automobile tire inflater gauge, including a gauge housing, wherein the improvements comprise a smooth bore acceptor chamber extending from a valve piston bore out the bottom of the gauge, a second member accessory suitably configured to be snugly inserted into said acceptor chamber, said acceptor chamber having annular lock ring means for securing said inserted second member in place against removal by vandals, whereby the interlock is airtight, removable as required, and secure enough to discourage vandalism.

2. An improved automobile tire inflater gauge as recited in claim 1, wherein the vandal-resistant locking means comprises a smooth bore female cylindrical acceptor chamber of pre-determined diameter extending, in line, from the bottom of the valve piston bore through the bottom of the gauge, and an accessory including an insertion member of suitable cylindrical dimensions and o-rings and an lock-notch groove for insertion into the acceptor chamber.

3. An improved automobile tire inflater gauge as recited in claim 2, wherein said acceptor chamber further includes a lock-ring groove having a pre-determined width and depth circumscribing at a pre-determined position, the exterior of the gauge housing of the acceptor chamber.

4. An improved automobile tire inflater gauge as recited in claim 3, wherein said acceptor chamber further includes a plurality of slots penetrating outward through the chamber housing wall into the bottom of said external lock-ring groove.

5. An improved automobile tire inflater gauge as recited in claim 1, wherein said suitably configured accessory includes a male cylindrical insertion member of pre-determined length and diameter, having at pre-determined points a plurality of o-rings slots and a lock-notch groove circumscribing said insertion member, whereby when inserted in the smooth bore acceptor chamber the lock-notch groove is engaged by the notches of the lock ring and held in place.

6. An improved automobile tire inflater gauge as recited in claim 1, wherein the vandal-resistant locking means second member comprises an open annular lock-ring having a pre-determined diameter and having a plurality of center-facing protuberant lock-notches, whereby the lock ring in being placed in the lock-ring groove, said lock-notches will pass through the chamber wall slots and into the lock groove of the accessory insertion member, locking the accessory insertion member securely enough in place to discourage vandalism.

7. An improved automobile tire inflater gauge as recited in claim 1 including a gauge barrel, wherein said improvements further include a replaceable cylindrical protective sleeve slidably positioned externally over the gauge barrel.

8. An improved automobile tire inflater gauge as recited in claim 1, wherein said improvements further include an internal air flow back-flow check valve.

9. A vandal-resistant method for attaching gauge accessories to a tire inflater gauge comprising:

(A) providing a smooth bore acceptor chamber open to the bottom of the gauge which operatively communicates with a valve piston bore and is able to accept gauge accessory insertion member of similar dimensions, (B) providing removable annular ring locking means which interact with slots in the wall of said chamber for locking said insertion member into said chamber, whereby an appropriately configured accessory can be inserted into and locked securely to the inflater gauge and is removable if required.

\* \* \* \* \*